June 26, 1956  B. J. POWELL  2,751,795
HAND BRAKE PULL ROD ASSEMBLY
Filed Sept. 7, 1950  2 Sheets-Sheet 1
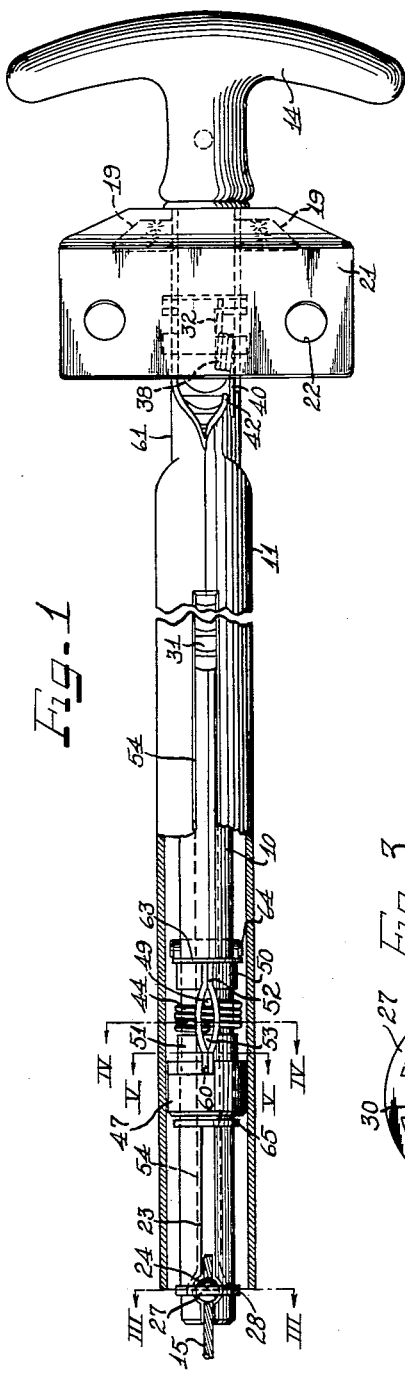
Inventor
Burnet J. Powell June 26, 1956 B. J. POWELL 2,751,795
HAND BRAKE PULL ROD ASSEMBLY
Filed Sept. 7, 1950 2 Sheets-Sheet 2
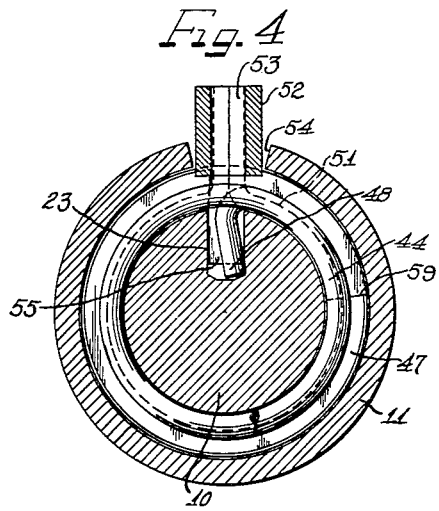
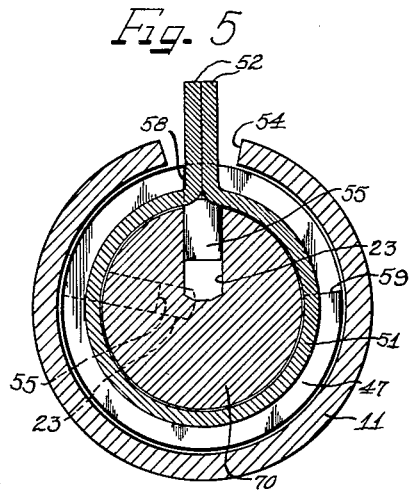
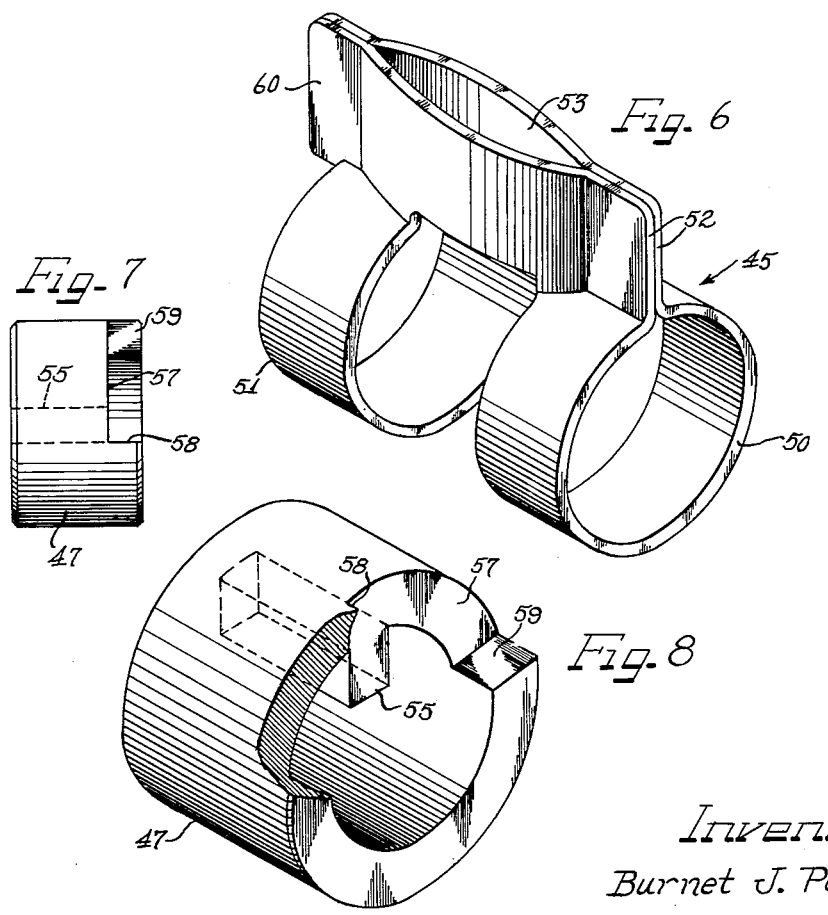
Inventor
Burnet J. Powell United States Patent Office 2,751,795
Patented June 26, 1956

2,751,795

HAND BRAKE PULL ROD ASSEMBLY

Burnet J. Powell, North Chicago, Ill., assignor to Houdaille Industries, Inc., a corporation of Michigan Application September 7, 1950, Serial No. 183,535

17 Claims. (Cl. 74—503)

The present invention relates to improvements in hand brake pull rod assemblies and more particularly to improvement in that type of hand brake assembly wherein a pull rod is slidably disposed in a guide tube and is connected directly to a brake setting cable.

An important object of the invention is to provide improved means in a hand brake pull rod assembly for normally maintaining a pull rod in ratcheting relation to a brake setting or rod position maintaining pawl and from which position the pull rod is adapted to be turned at will for releasing the brake.

Another object of the invention is to provide improved hand brake pull rod rotational biasing means.

A further object of the invention is to provide improved torsion mechanism for a hand brake pull rod assembly.

Still another object of the invention is to provide improved means for attaching a cable to the forward end of a hand brake pull rod.

Yet another object of the invention is to provide improved support means for a hand brake pull rod assembly.

A still further object of the invention is to provide improved pawl biasing means for a ratchet type hand brake pull rod assembly.

Other objects, features and advantages of the present invention will be readily apparent from the following detailed description of a preferred embodiment thereof taken in conjunction with the accompanying drawings in which:

Figure 1 is a top plan view of a hand brake pull rod assembly embodying the invention and with certain portion thereof broken away for clarity of illustration;

Figure 2 is a fragmental side elevational view of the hand brake pull rod assembly also with a portion broken away for clarity of illustration;

Figure 3 is an enlarged transverse sectional view taken substantially on the line III—III of Figure 1;

Figure 4 is an enlarged transverse sectional detail view taken substantially on the line IV—IV of Figure 1;

Figure 5 is an enlarged transverse sectional detail view taken substantially on the line V—V of Figure 1;

Figure 6 is an enlarged isometric view of the slidable torsion spring anchor and stop member of the rod torsioning assembly;

Figure 7 is a top plan view of the stop collar of the rod torsioning mechanism; and Figure 8 is an enlarged isometric view, partially broken away for clarity of illustration, of the stop collar of the torsion mechanism.

In the illustrated embodiment of the invention, an elongated ratchet pull rod 10 is slidably guided for reciprocal and rotary movement in a guide housing in the form of a tube 11 of a length to extend between an instrument panel 12 in a vehicle such as an automobile and a fire wall or dash panel 13 of the vehicle spaced forwardly from the instrument panel. At its rear end and accessible under the instrument panel 12, the pull rod 10 has a handle 14 by which it can be conveniently manipulated for setting or releasing a brake such as an emergency brake system of the vehicle controlled through the medium of a cable 15 attached to the forward end of the pull rod 10.

Attachment of the housing tube 11 to the instrument panel 12 is effected through the medium of an attachment bracket and combined escutcheon plate 17 secured to the rear end of the housing tube. The attachment plate 17 faces rearwardly and has a forwardly directed marginal reinforcing flange 18 which is formed at the lower portion of the plate 17 to engage snugly about the rear end portion of the tube 11 and is secured thereto as by welding. From its lower portion, the plate 17 flares laterally and extends upwardly and is secured as by welding to a pair of laterally extending wing-like attachment flanges 19 formed at the rear ends of parallel upwardly projecting side wall portions 20 on the rear portion of the guide housing tube 11, thereby effecting a very rigid assembly of the plate 17 to the guide housing tube 11. At its upper extremity, the plate 17 is provided with a rearwardly extending, generally upwardly facing attachment flange portion 21 provided with bolt apertures 22 adjacent the opposite sides thereof for receiving attachment bolts by which the assembly is secured to the instrument panel 12.

At its rear end the housing tube 11 projects through an appropriate aperture in the fire wall 13 and the forward end of the pull rod 10 is accessible through the open end of the tube 11 for its attachment to the brake cable 15. Such attachment is effected in an improved manner as best seen in Figures 1, 2 and 3 by simple but efficient anchorage of the end portion of the cable 15 to the forward end portion of the rod 10. To this end, the rear end portion of the pull rod 10 has a longitudinally extending slot 23 therein which intersects a blind end transverse bore 24 adjacent to the end of the pull rod and opening radially therefrom in the same direction as the slot 23. Within the bore 24 is received, as in a socket, an anchoring ball 25 secured on the end portion of cable, the slot 23 forwardly from the socket bore 24 accommodating the cable 15. In this manner the cable is interlocked through the medium of the socket 24 and the anchoring ball 25 with the forward end portion of the pull rod 10.

In order to lock the anchoring knob or ball 25 against unintentional displacement from the end portion of the pull rod 10, a generally E-shaped retainer 27 is provided which may be a sheet metal stamping of appropriate gauge having a pair of arcuate legs 28 bowed toward one another and dimensioned to engage embracingly about the forward end portion of the rod 10 within an annular outer peripheral groove 29 on the rod and cutting across the open end of the socket bore 24. The length of the arms 28 is such that the arms will engage embracingly about the rod 10 within the groove 29 when the central portion of the retainer 27 is over the mouth of the socket bore 24 so that the anchoring knob 25 of the cable is prevented from escaping from the bore.

Additional security of anchoring attachment of the cable to the pull rod is effected by providing the retaining member 27 with a central lug 30 extending between the legs 28 a sufficient distance to enter partially into the socket bore 24 and thus prevent the retainer 27 from turning about the rod. This avoids the possibility that the retainer might be caused to turn about the rod due to vibrations in the operation of the vehicle and thus allow the cable anchoring member 25 to escape from between the spaced apart ends of the legs 28. The lug 30 also functions to retain the cable end against whipping in the end of the pull rod by holding the knob 25 down in the bottom of the socket bore 24.

By selecting the material from which the retainer 27 is made to be somewhat resilient, the retainer can be snapped into place, or removed as desired. For this purpose the legs 28 of the retainer are made just long enough to engage the rod just beyond 90° removed from the center of the mouth of the socket bore 24.

In setting the brake, the pull rod 10 is drawn rearwardly through the medium of the handle 14 and tension thereby applied to the cable 15. Incremental brake setting tension upon the cable is maintained by retaining the pull rod 10 in brake setting position through the medium of a pawl and ratchet mechanism comprising a series of ratchet teeth 31 formed transversely across a substantially longitudinal portion of the periphery of the rod 10 and disposed in operative relation to a retaining pawl 32 which is pivotally mounted between the housing walls 20. For this purpose the pawl 32 is of plate-like structure having a pair of laterally extending pivot arms 33 projecting from the sides of the pawl adjacent to its margin remote from its ratchet engaging margin and engaging pivotally in respective pivot apertures 34 formed in the side walls 20. The opposite sides of the pawl 32 are provided adjacent to the ratchet engaging edge thereof with respective idler arms 35 which extend through arcuate clearance slots 37 in the side walls 20. A biasing spring 38 comprising a coiled torsion wire spring is disposed about one of the pivot arms 33 of the pawl and has a biasing leg 39 in engagement with the adjacent idler arm 35 of the pawl while the opposite leg of the spring, identified at 40, is engaged with the adjacent wall 20, being anchored within a slit 41 in the forward portion of the wall and from which an anchoring lug 42 is pressed inwardly. This provides a simple, yet quite effective spring bias for the pawl 32, normally maintaining the pawl in engagement with the adjacent surface of the pull rod 10 and in operative ratcheting relation to the ratchet teeth 31.

In order to release the pawl 32 from the ratchet teeth, the rod 10 is rotated to present a smooth portion of its periphery at one side of the series of ratchet teeth 31 into slidable engagement with the pawl 32 so that the pull rod can move forwardly into brake releasing position.

It is highly desirable to assure positioning of the pull rod 10 normally in the operative relationship of the ratchet teeth 31 and the pawl 32 for normal brake setting and brake holding functioning of the assembly so as to avoid accidental release of the brake, or a non-ratcheting position of the pull rod when the same is pulled for setting the brake. On the other hand, the pull rod 10 should be readily turnable into the brake releasing position at will. According to the present invention improved means are provided for this purpose comprising a torsioning and rotary limit assembly 43 of novel construction.

The torsion and stop unit 43 is characterized in that it comprises a minimum number of relatively simple components that can be manufactured and assembled economically. To this end the assembly comprises a coiled torsion spring 44, a spring torsioning and stop member 45 and a bearing and stop bushing 47. These components are cooperatively assembled upon the pull rod 10 forwardly from the series of ratchet teeth 31.

The torsion spring 44 comprises a plurality of coils of a diameter to fit freely about the rod 10. One end of the spring 44 is turned inwardly to provide an engagement finger or lug 48 (Figures 2 and 4) which is engaged in the rear end portion of the longitudinal slot 23 in the pull rod. The opposite end portion of the spring 44 is directed generally radially outwardly to provide an engagement finger or lug 49 which is interengaged with the spring tensioning and stop member 45.

Means are provided whereby the member 45 is supported in freely relatively rotatable relation by the rod 10 but is held against turning with the rod. To this end, the member 45 preferably comprises a sheet metal stamping having a pair of coaxial, longitudinally spaced loop portions 50 and 51 which are of a diameter to engage about the rod 10 in freely slidable relation. The loops 50 and 51 are connected together in one piece by a pair of flanges 52 extending radially from the loops and joined together in face-to-face relation, and provide a longitudinal fin on the torque sleeve member 45.

In addition to their loop connecting function, the abutting flanges 52 serve also as means for interconnecting the torsion arm 49 of the torsion spring and for interengagement with the tube 11 for retaining the member 45 against rotation with the rod 10. For this purpose, the flanges 52 are intermediately spaced apart to provide a pocket or socket 53 (Figures 1 and 6) within which the spring torsion arm 49 is anchored. The bowed outer sides of the intermediate flange portions cooperate with the edges defining a longitudinal slot 54 in the housing tube 11 through which the flanges project (Figures 2 and 4) slidably. The length of the slot 54 is sufficient to permit a full range of reciprocal movement of the pull rod 10 with the member 45 traveling in a fixed longitudinal relation on the rod 10. It will be observed in Figure 2 that the slot 54 opens through the forward end of the tube 11.

The bushing member 47 (Figures 1, 2, 7 and 8) serves not only as stop means cooperative with the member 45 to limit rotation of the pull rod 10, but also serves as a bearing for the pull rod. Accordingly, the bushing 47 comprises a body having an internal diameter to be received freely on the pull rod 10 and an external diameter to be received slidably within the tube 11, as best seen in Figures 1 and 2, which throughout the major portion of its length is of larger diameter than the rod 10. In economical commercial form, the member 47 may be formed as a die casting. For retaining the member 47 against relative rotation on the rod 10, the bushing member is provided with a longitudinal, radially inwardly projecting key lug 55 dimensioned to be received in keying relation in the slot 23 of the pull rod (Figures 2 and 5). Through this arrangement the bushing 47 turns with the rod 10.

In order to limit the range of rotary movement of the rod 10, the bushing 47 has in one end thereof a recess 57 defined by opposing shoulders 58 and 59. These shoulders are preferably spaced apart about 83° and are engageable with respectively opposite sides of a stop lug or ear projection 60 that extends from the end of the member 45 beyond the outer edge of the bearing loop 51 thereof. As best seen in Figures 1 and 5, it will be observed that the stop shoulder 58 is disposed to engage against the stop lug 60 in the ratcheting position of the rod 10, and the torsion spring 44 is tensioned normally to bias the rod 10 rotatably into such relationship. Then, when the rod 10 is turned, counterclockwise as shown in dash outline in Figure 5, the bushing 47, by reason of the key in connection with the rod is turned with the rod until the shoulder 59 engages the stop lug 60. In this turned rotary position of the rod, release of the pawl 32 from the ratchet teeth 31 is effected. Promptly upon release of the turning torque on the rod 10 by release of the handle 14, the rod 10 is snapped back to the ratcheting position by action of the spring 44 coacting with the rod 10 and the tensioning member 45.

In addition to its stop function, the bushing 47 also serves as the bearing for the forward end portion of the rod 10. The rear end portion of the rod 10 is sliably supported by a reduced diameter journal portional 61 of the rear end portion of the tubular housing 11 which has a rear terminal circular or ring bearing terminus 62.

Assembly of the torsioning and stop assembly 43 with the pull rod 10 is very easily effected by sliding the same into position on the rod from the forward end of the rod. Thus, the torsion spring 44 is preliminarily assembled with the member 45 between the bearing loops 50 and 51 and with the torsion arm 49 projecting up into the gap or socket 53 therefor. The sub-assembly thus effected is then slid onto the rod from the forward end of the rod with the spring anchoring finger 48 in the slot 54 in the rod. The bushing member 47 is then also assembled slidably onto the rod with the key lug 55 in the slot 23. The rearward location of the assembly is defined by a washer 63 which bears against a transverse pin 64 through the body of the rod 10. Forward displacement of the assembly 43 is prevented by a snap-on C-retainer 65 which engages in an annular groove 67 provided therefor in the periphery of the rod 10. If for any reason the assembly 43 needs to be removed from the rod this can easily be effected by removing the retainers 27 and 65 and sliding the assembly forwardly off of the rod.

It will be understood that modifications and variations may be effected without departing from the scope of the novel concepts of the present invention.

I claim as my invention:

1. In combination in a hand brake actuating assembly, a pull rod having a handle at its rear end and means at its forward end for attachment to a brake setting cable, an elongated tubular housing within which the rod is reciprocable, interengaging pawl and ratchet means on the housing and rod for retaining the rod in various brake setting positions, said tubular housing being throughout its major extent of substantially larger diameter than the rod, means on the tubular housing adjacent its rear end bearingly supporting the rod, a bearing bushing carried adjacent to the forward end of the rod and affording limited area sliding engagement with the enlarged diameter portion of the tubular housing, said rod being rotatable in the housing as well as reciprocable, and means reciprocably movable with said rod but help against rotation therewith and cooperating with the bushing for limiting the range of rotary movement of the rod.

2. In combination in a straight pull brake lever assembly, a reciprocable and rotatable pull rod, an elongated guide housing for the pull rod, said housing being of a length substantially to encase the pull rod and having a narrow longitudinal opening therein extending throughout a major portion of the length of the housing, means for attaching the housing in a vehicle in position to enable attachment of a brake cable to one end portion of the rod, the opposite end of the rod having means for manipulation of the rod, a longitudinal series of transverse ratchet teeth on the rod, pawl means carried by the housing and engageable with the teeth for holding the rod in incremental brake setting longitudinal positions within the housing, the rod being rotatable to clear the ratchet teeth from the pawl means, and means carried by the pull rod and movable reciprocably therewith comprising a torsion spring having an end anchored on the rod and a torque sleeve member having laterally projecting flange means thereon extending through said opening in close relation to the opposite longitudinal edges of the opening, the spring having an opposite end anchored in said flange means, the rod being rotatable relative to said sleeve member and thereby tensioning said spring to return the rod to the position from which it was turned.

3. In a hand brake pull rod assembly, an elongated housing, a pull rod reciprocably and rotatably guided in said housing, said housing having a narrow longitudinal opening therein having opposite longitudinal edges defining the same, means carried by the housing and interengageable with the rod for retaining the rod in incremental longitudinal brake setting positions and releasable from the retaining engagement with the rod by turning of the rod, a torque sleeve member carried by the rod in relatively rotatable relation and having a portion thereof projecting through said opening in close relation to the opposite edges thereof, a torsion spring having an end anchored to move with the rod and an end onchored on said torque sleeve member and normally maintained under torsion load to have a rotary bias in one direction on the rod, and a stop member carried by the rod and having interengagement with said sleeve member for limiting the range of rotary movement of the rod relative to the sleeve member.

4. In a hand brake pull rod assembly, an elongated housing, a pull rod reciprocably and rotatably guided in said housing, said housing having a longitudinal opening therein having an edge defining the same, means carried by the housing and interengageable with the rod for retaining the rod in incremental longitudinal brake setting positions and releasable from the remaining engagement with the rod by turning of the rod, a torque sleeve member carried by the rod in relatively rotatable relation and having a portion thereof projecting through said opening for engagement with said edge, a torsion spring having an end anchored to move with the rod and an end anchored on said torque sleeve member and normally maintained under torsion load to have a rotary bias in one direction on the rod, and a stop member carried by the rod and having abutting interengagement with said sleeve member for limiting the range of rotary movement of the rod relative to the sleeve member, said stop member having bearing engagement with said guide housing for assisting in reciprocal guiding of the rod in the housing.

5. In a hand brake pull rod assembly including a housing including a longitudinal bearing surface, a pull rod longitudinally and rotatably supported by the housing, a sleeve member relatively rotatably but non-axially movably carried by the rod and having a portion slidably bearingly engaging said bearing surface, a torsion spring anchored on the rod and on said sleeve member and normally acting to rotatably bias the rod in one direction, said sleeve member having a stop lug projecting therefrom, and a stop member carried by the rod and rotatable therewith and having rotation limiting abutting engagement with said stop lug.

6. In a straight pull brake lever assembly including a supporting and bearing housing and a pull rod supported reciprocably and rotatably in the housing, the housing having a longitudinal opening therein, a sleeve member slidably rotatably mounted on the rod and engageable with the edges defining said opening, means retaining the sleeve member against longitudinal movement on the rod in one direction, a bushing nonrotatably mounted on the rod and retaining the sleeve member against longitudinal movement on the rod in the opposite direction, said bushing and said sleeve member having opposing portions enabling a limited range of relative rotary movement between the rod and the sleeve member, and a torsion spring anchored at on end on the rod and at the other end on said sleeve member and normally biasing the sleeve member and the rod to assume one relative rotary position as limited by said interengaging portions of the sleeve member and bushing.

7. In a straight pull brake lever construction, an elongated housing having means providing a longitudinally elongated opening, a pull rod reciprocable and rotatable in said housing, a longitudinal slot in one end portion of the pull rod, a torsion spring having an end anchored in said slot and another end projecting outwardly away from the spring and the spring encircling the pull rod, a sleeve member slidably mounted on the pull rod and having said outwardly projecting end of the spring anchored thereon, said member having a portion projecting through said opening and held thereby against relative rotation with the rod, means retaining the sleeve member against longitudinal movement on the rod in one direction, and a bushing having a key portion engaging in said slot in the rod and having a pair of opposed spaced stop shoulders, said sleeve member having a lug disposed between said shoulders whereby to limit rotary movement of the rod by engagement of said lug with the respective shoulders.

8. In combination in a straight pull brake actuating assembly, an elongated guide housing, a pull rod in said guide housing and adapted for operative attachment to a brake setting cable, said housing having an elongated bearing surface extending generally normal to the surface of said rod, a member mounted relatively rotatably but against axial movement on said rod, said member having a portion projecting into engagement with said bearing surface, a torsion spring normally biasing the rod in one rotary direction, a lug projecting longitudinally from said member, and means on said rod providing opposed spaced shoulders substantially fixedly disposed with respect to the rod and movable in the rotation of the rod alternately into engagement with said lug for delimiting the rotary movement of the rod with respect to said member, engagement of said member with said bearing surface holding the same against movement in the rotary direction of the rod when the rod is rotated.

9. In a straight pull brake lever pull rod torsioning mechanism device, a one-piece sheet metal sleeve member comprising a spaced pair of sleeve rings and an integral flange fin structure comprising radial flanges connecting the sleeve rings in coaxial spaced relation and disposed in face-to-face abutment, said flanges being intermediately bowed apart to provide a spring arm anchoring socket opening therebetween.

10. In a straight pull brake lever assembly including a pull rod, the forward end portion of the pull rod having a longitudinal slot and a radial blind end cable anchor bore intersecting the slot, an annular groove on the pull rod intersecting the mouth of said bore, and a snap-on retaining member of generally E-shape having a pair of arms directed toward one another for grippingly engaging the pull rod in said groove and an intermediate lug retainingly engaging in the mouth portion of said socket bore.

11. In combination in a straight pull brake lever assembly, a tubular guide member adapted to be attached to the interior of a vehicle, a pull rod member extending axially through said guide member and being of substantially smaller diameter than the inside diameter of at least a substantial longitudinal portion of the guide member, means on said guide member and said pull rod interacting to maintain the pull rod in incremental relative longitudinal brake setting positions and being releasable by rotation of the rod relative to said tubular member, the portion of the rod within said larger diameter portion of the tubular member having a radially opening recess therein, a bushing encircling said portion of the rod and having a radially inwardly projecting keying lug in said recess to maintain the bushing for rotary movement with the rod, the outer diameter of the bushing being dimensioned to provide a sliding bearing with the larger diameter portion of the guide member to thereby maintain the rod centered within the tubular member, one edge of the bushing having a recess defined by spaced stop shoulders, and means cooperatively related to the rod and the guide member and movable longitudinally with the rod and having a portion engaging between said spaced stop shoulders to limit rotary movement of the rod by engagement of said stop shoulders therewith in opposite relative positions of rotary movement of the rod.

12. In a straight pull brake lever assembly including a pull rod and a tubular guide member for the pull rod within which the rod is reciprocable, the forward end portion of the tubular member being of substantially greater diameter than the forward end portion of the pull rod, means providing a bearing within said larger diameter portion of the guide member maintaining the pull rod in coaxial relation therein, the forward end portion of the pull rod having a longitudinal slot and a radial blind end cable anchor bore intersecting the slot, an annular groove on the pull rod intersecting the mouth of said bore, and a snap-on retaining member of generally E-shape having a pair of arms directed toward one another for grippingly engaging the pull rod in said groove and also having an intermediate lug directed radially inwardly and retainingly engaging in the mouth portion of said socket bore for retaining in said bore, an anchoring member on the end of a brake cable to maintain the cable against escape from said slot, the outside diameter of said retaining member being smaller than the inside diameter of the enlarged portion of the guide member to clear the same for movement of the retaining member with the rod within said enlarged portion of the guide member.

13. In a hand brake pull rod assembly, an elongated housing, a pull rod reciprocably and rotatably guided in said housing, said housing having a longitudinal opening therein having an edge defining the same, means carried by the housing and interengageable with the rod for retaining the rod in incremental longitudinal brake setting positions and releasable from the retaining engagement with the rod by turning of the rod, a torque sleeve member carried by the rod in relatively rotatable relation and having a portion thereof projecting through said opening for engagement with said edge, and a stop member carried by the rod and having abutting interengagement with said sleeve member for limiting the range of rotary movement of the rod relative to the sleeve member.

14. In a hand brake pull rod assembly, an elongated housing, a pull rod reciprocably and rotatably guided in said housing and having a slot, means carried by said housing and interengageable with the rod for retaining the rod in incremental releasable brake setting positions and releasable from the retaining engagement with the rod by turning of the rod, means carried by said rod for reciprocal movement therewith, said housing engaging said last-mentioned means to prevent rotation thereof when said rod is rotated, and a stop member carried by the rod and rotatable therewith, said stop member comprising a bushing having a radially inwardly projecting keying lug for reception in said slot in the pull rod, one edge of the bushing having a recess defined by spaced stop shoulders for engagement with said last-mentioned means to limit rotary movement of the rod relative to said last-mentioned means.

15. In combination in a straight pull brake lever assembly, a tubular guide member adapted to be attached to the interior of a vehicle, a pull rod longitudinally reciprocably mounted in said guide member and extending axially through said guide member and being of substantially smaller diameter than the inside diameter of at least a substantial longitudinal portion of the guide member, means on said guide member and said pull rod interacting to maintain the pull rod in incremental longitudinal brake setting positions and being releasable by rotation of the rod relative to said tubular guide member, a bushing encircling a portion of the rod within said guide member and mounted for rotary movement with the rod, the outer diameter of the bushing being dimensioned to provide a sliding bearing with the larger inside diameter portion of the guide member to maintain the rod centered within the tubular member, said bushing having a recess defined by spaced stop shoulders, and means cooperatively related to the rod and the guide member and movable longitudinally with the rod and having a portion engaging between said spaced stop shoulders to limit rotary movement of the rod.

16. In combination in a straight brake lever assembly, a tubular guide member adapted to be attached to the interior of a vehicle and having a longitudinal slot therein, a pull rod longitudinally reciprocable relative to said guide member and extending axially within said guide member and being of substantially smaller diameter than the inside diameter of at least a substantial longitudinal portion of the guide member, means on said guide member and said pull rod interacting to maintain the pull rod in incremental longitudinal brake setting positions and being releasable by rotation of the rod relative to said tubular guide member, a bushing encircling a portion of the rod within the larger diameter portion of the tubular member and mounted for rotary movement with the rod, the outer diameter of the bushing being dimensioned to provide a sliding bearing with the larger diameter portion of the guide member to maintain the rod centered within the tubular guide member, the bushing having spaced stop shoulders, a stop member having a pair of sleeve ring portions spaced longitudinally and disposed coaxially for relative rotary sliding engagement with said pull rod, and a fin flange connecting said sleeve ring portions and projecting radially therebeyond for engagement within the longitudinal slot in the tubular guide member, a torsion spring engaging said rod and said stop member for biasing the rod in one rotary direction, and a lug projecting longitudinally from said stop member for abutting engagement with said spaced stop shoulders to limit rotary movement of the rod.

17. In combination in a straight pull brake lever assembly, a tubular guide member adapted to be attached to the interior of a vehicle, a pull rod longitudinally reciprocably mounted relative to said guide member and extending axially through said member and being of substantially smaller diameter than the inside diameter of at least a substantial longitudinal portion of the guide member, means on said guide member and said pull rod interacting to maintain the pull rod in incremental longitudinal brake setting positions and being releasable by rotation of the rod relative to said tubular member, a bushing encircling a portion of the rod within the larger diameter portion of the guide member and providing a sliding bearing with the larger diameter portion of the guide member to maintain the rod centered within the tubular member, said guide member having an elongated bearing surface, a stop member mounted relatively rotatably but against axial movement on said rod, said stop member having a portion projecting into engagement with said bearing surface, a torsion spring biasing the rod in one rotary direction, a lug projecting longitudinally from said member, and means on said bushing providing opposed spaced shoulders and movable in the rotation of the rod alternately into engagement with said lug for delimiting the rotary movement of the rod with respect to said stop member, engagement of said stop member with said bearing surface holding the same against movement in the rotary direction of the rod when the rod is rotated.

References Cited in the file of this patent

UNITED STATES PATENTS

| | | | |
|---|---|---|---|
| 515,420 | Byers | Feb. 27, | 1894 |
| 1,623,616 | Booty | Apr. 5, | 1927 |
| 1,713,842 | Link | May 21, | 1929 |
| 1,788,861 | Crawford | Jan. 13, | 1931 |
| 2,295,792 | Jandus | Sept. 15, | 1942 |
| 2,304,356 | Heller | Dec. 8, | 1942 |
| 2,305,234 | Bratz | Dec. 15, | 1942 |
| 2,315,962 | Jandus | Apr. 6, | 1943 |
| 2,329,722 | Jandus | Sept. 21, | 1943 |
| 2,338,725 | Larson | Jan. 11, | 1944 |
| 2,375,548 | Gilmore | May 8, | 1945 |
| 2,429,224 | Fergueson et al. | Oct. 21, | 1947 |
| 2,477,589 | Du Shane | Aug. 2, | 1949 |
| 2,486,098 | Batterson | Oct. 25, | 1949 |
| 2,543,509 | Sandberg | Feb. 27, | 1951 |
| 2,543,510 | Sandberg | Feb. 27, | 1951 |
| 2,580,026 | Jacobi | Dec. 25, | 1951 |
| 2,608,881 | Sandberg | Sept. 2, | 1952 |
| 2,631,470 | Sandberg | Mar. 17, | 1953 |
| 2,632,338 | Sandberg | Mar. 24, | 1953 |